United States Patent
Yamane (10) Patent No.: US 10,665,258 B2
(45) Date of Patent: May 26, 2020

(54) MAGNETIC HEAD AND MAGNETIC DISK DEVICE INCLUDING THE SAME

(71) Applicants: Kabushiki Kaisha Toshiba, Minato-ku, Tokyo (JP); Toshiba Electronic Devices & Storage Corporation, Minato-ku, Tokyo (JP)

(72) Inventor: Masami Yamane, Kawasaki Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/266,148

(22) Filed: Feb. 4, 2019

(65) Prior Publication Data

US 2020/0090693 A1 Mar. 19, 2020

(30) Foreign Application Priority Data

Sep. 13, 2018 (JP) .................................. 2018-171477

(51) Int. Cl.
  *G11B 5/60* (2006.01)
(52) U.S. Cl.
  CPC .................................. *G11B 5/6082* (2013.01)

(58) Field of Classification Search
  CPC .................................................... G11B 5/6082
  USPC ............................................... 360/236–236.6
  See application file for complete search history.

(56) References Cited

U.S. PATENT DOCUMENTS

| 7,872,833 B2* | 1/2011 | Hu ........................ | G11B 5/6005 |
|---|---|---|---|
| | | | 360/236.1 |
| 2007/0047143 A1 | 3/2007 | Matsumoto | |
| 2011/0032641 A1* | 2/2011 | Ookubo ............... | G11B 5/6005 |
| | | | 360/235.5 |
| 2011/0122532 A1 | 5/2011 | Bolasna et al. | |
| 2012/0134055 A1 | 5/2012 | Tsuda et al. | |

* cited by examiner

*Primary Examiner* — Allen T Cao
(74) *Attorney, Agent, or Firm* — White & Case LLP (57) ABSTRACT

According to one embodiment, a magnetic head includes a slider with an air bearing surface, and a head element in the slider. The slider includes a leading step at a leading side end of the air bearing surface, a trailing step at a trailing side end of the air bearing surface and including the head element, a deep groove formed between the leading step and the trailing step and opening to the air bearing surface, a center rail extending from a center portion of the air bearing surface to the trailing step, and a pair of pressure generators disposed between the center rail and each side edge.

8 Claims, 8 Drawing Sheets

FIG. 8A (Normal state)  FIG. 8B (Impact applied state)

MAGNETIC HEAD AND MAGNETIC DISK DEVICE INCLUDING THE SAME

CROSS-REFERENCE TO RELATED APPLICATIONS

This application is based upon and claims the benefit of priority from Japanese Patent Application No. 2018-171477, filed Sep. 13, 2018, the entire contents of which are incorporated herein by reference.

FIELD

Embodiments described herein relate generally to a magnetic head and a magnetic disk device including the same.

BACKGROUND

Hard disk drive (HDD) and the like include, as a magnetic disk device, a magnetic disk provided therewith rotatably, and a magnetic head configured to write/read data to/from the magnetic disk. In HDD in the operation state, the magnetic head hovers on air current produced by the rotation of the magnetic disk and faces the surface of the magnetic disk with a slight gap therebetween.

When an external impact is applied to HDD, the impact may cause a concave or convex deformation in the inner periphery or the outer periphery of the magnetic disk. The deformation of magnetic disk changes the flying state of the magnetic head, and the magnetic head may contact the magnetic disk surface. In that case, the magnetic disk and/or magnetic head may be damaged.

DETAILED DESCRIPTION

Various embodiments will be described hereinafter with reference to the accompanying drawings. In general, according to one embodiment, a magnetic head comprises a slider comprising an air bearing surface with a pair of side edges, a pair of side surfaces along the pair of side edges of the air bearing surface, a leading side end surface, and a trailing side end surface; and a head element in the slider, configured to process data. The slider comprises a leading step at a leading side end of the air bearing surface, a trailing step at a trailing side end of the air bearing surface and including the head element, a deep groove formed between the leading step and the trailing step and opening to the air bearing surface and the pair of side surfaces, a center rail extending from a center portion of the air bearing surface to the trailing step, and a pair of pressure generators disposed between the center rail and each side edge.

Note that the disclosure is an example, and the contents of the following description do not limit the scope of the invention. Variations which will easily be conceivable by a person having ordinary skill in the art are naturally encompassed within the scope of the invention. In the figures, dimensions of components may be depicted schematically as compared to actual models of the invention for easier understanding. Elements corresponding to each other between different figures will be referred to by the same reference number, and explanation considered redundant may be omitted.

First Embodiment

Figure 1:
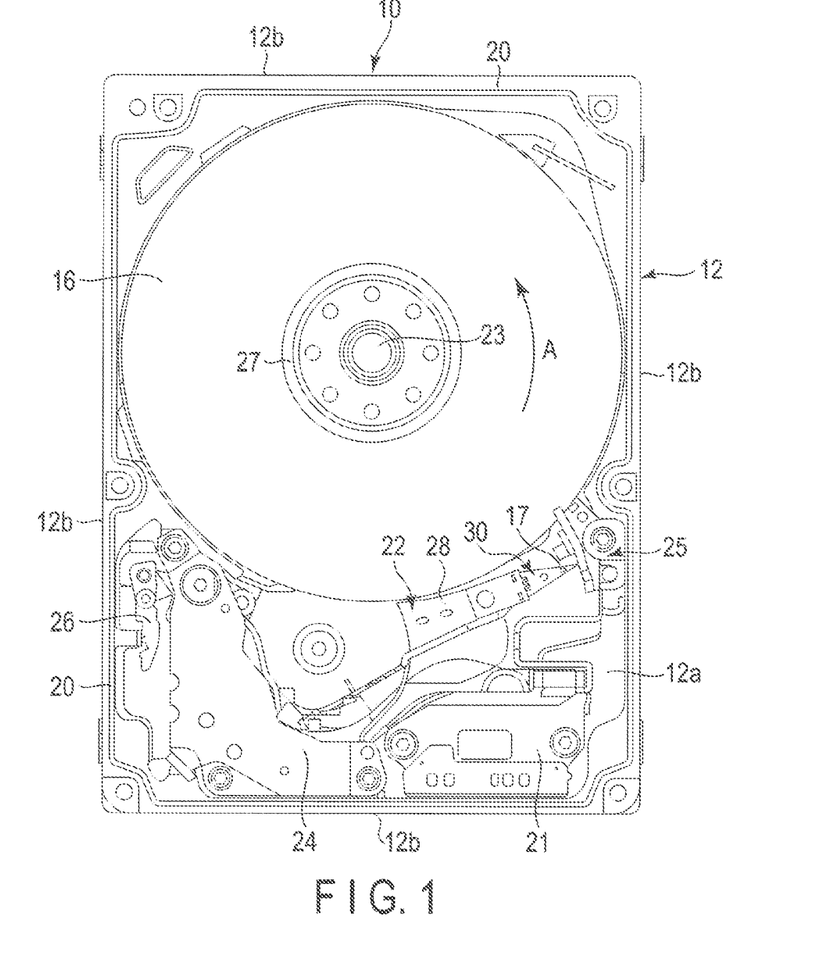
FIG. 1 is a plan view of the internal structure of hard disk drive (HDD) according to a first embodiment.

As an example of the magnetic disk device, a hard disk drive (HDD) of a first embodiment will be explained. FIG. 1 shows the inner structure of HDD of the first embodiment.

As shown in FIG. 1, the HDD comprises a casing 10. The casing 10 includes a rectanguler box-shaped base 12 with an upper surface opened and a top cover (which is not shown) which covers the upper end opening of the base 12. The base 12 includes a erctanguler bottom wall 12a and a side wall 12b standing along the periphery of the bottom wall 12a.

In the casing 10 are provided one or more magnetic disks 16 as disk-shaped recording madia and a spindle motor 23 as a driver configured to support and drive the magnetic disks 16 therein. The magnetic disks 16 are coaxially engaged on a hub (which is not shown) of the spindle motor 23, clamped and fixed to the hub by a clamp spring 27. The magnetic disks 16 are rotated by the spindle motor 23 in the direction of arrow A at a certain rotation rate.

In the casing 10 are provided a plurality of magnetic heads 17 configured to write/read data to/from the magnetic disks 16 and a carriage assembly 22 configured to support the magnetic heads 17 to be movable with respect to the magnetic disk 16 therein. In the casing 10 are provided a voice coil motor (VCM) 24 configured to rotate and position the carriage assembly 22, ramp load mechanism 25 configured to maintain the magnetic heads 17 to an unload position which is apart from the magnetic disks 16 when the magnetic heads 17 moves to the outermost periphery of the magnetic disk 16, latch mechanism 26 configured to maintain the carriage assembly 22 in an evacuation position when an impact or the like is applied to the HDD, and substrate unit 21 including a conversion connector or the like.

A printed circuit board (which is not shown) is fixed to the outer surface of the bottom wall 12a of the base 12 with screws. A controller is formed in the printed circuit board. The controller controls the operation of the VCM 24 and magnetic head 17 via a substrate unit 21 and controls the operation of the spindle motor 23.

Figure 2:
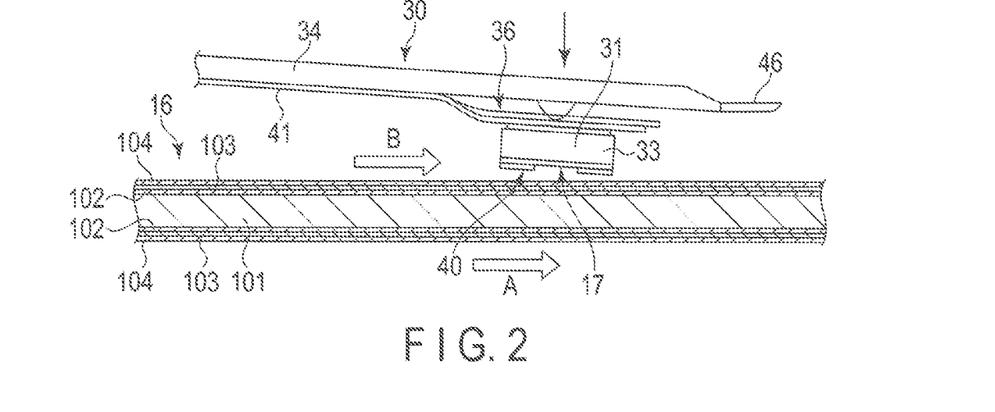
FIG. 2 is a side view of a magnetic disk, magnetic head, and suspension of the HDD in an enlarged manner.

FIG. 2 shows the magnetic head and the magnetic disk in a flying state in a schematic manner. As shown in FIGS. 1 and 2, the magnetic disk 16 includes a substrate 101 formed of a non-magnetic substance shaped in a circular plate having a diameter of approximately 88.9 mm (3.5 inch), for example. On both surfaces of the substrate 101, a soft magnetic layer 102 formed of a material indicative of softmagnetic characteristics, magnetic recording layer 103, and protection film layer 104 are laminated in this order as an underlying layer.

The carriage assembly 22 comprises a bearing portion (main body block) rotatably supported on the base 12, a plurality of arms 28 extending from the bearing portion, and a head gimbal assembly 30 extending from each arm 28. Each head gimbal assembly 30 includes a slender plate spring-shaped suspension 34, a flexure 41 disposed on the suspension 34 as a wiring member, and a magnetic head 17. The magnetic head 17 is supported at the dispail end of the suspension 34 via a gimbal portion 36 of the flexure 41.

As shown in FIG. 2, the magnetic head 17 is configured as a flying type head, and includes a slider 31 formed in a substantially rectangular parallelepiped shape and a head element 33 formed on an end portion on an outflow end (trailing) side of the slider 31. The slider 31 includes an air bearing surface (ABS) 40 facing the surface of the magnetic disk 16. The magnetic head 17 flies due to an air flow B generated between a surface of the magnetic disk 16 and the ABS 40 of the slider 31 by a rotation of the magnetic disk 16. The direction of the air flow B coincides with a rotation direction A of the magnetic disk 16.

Figure 3:
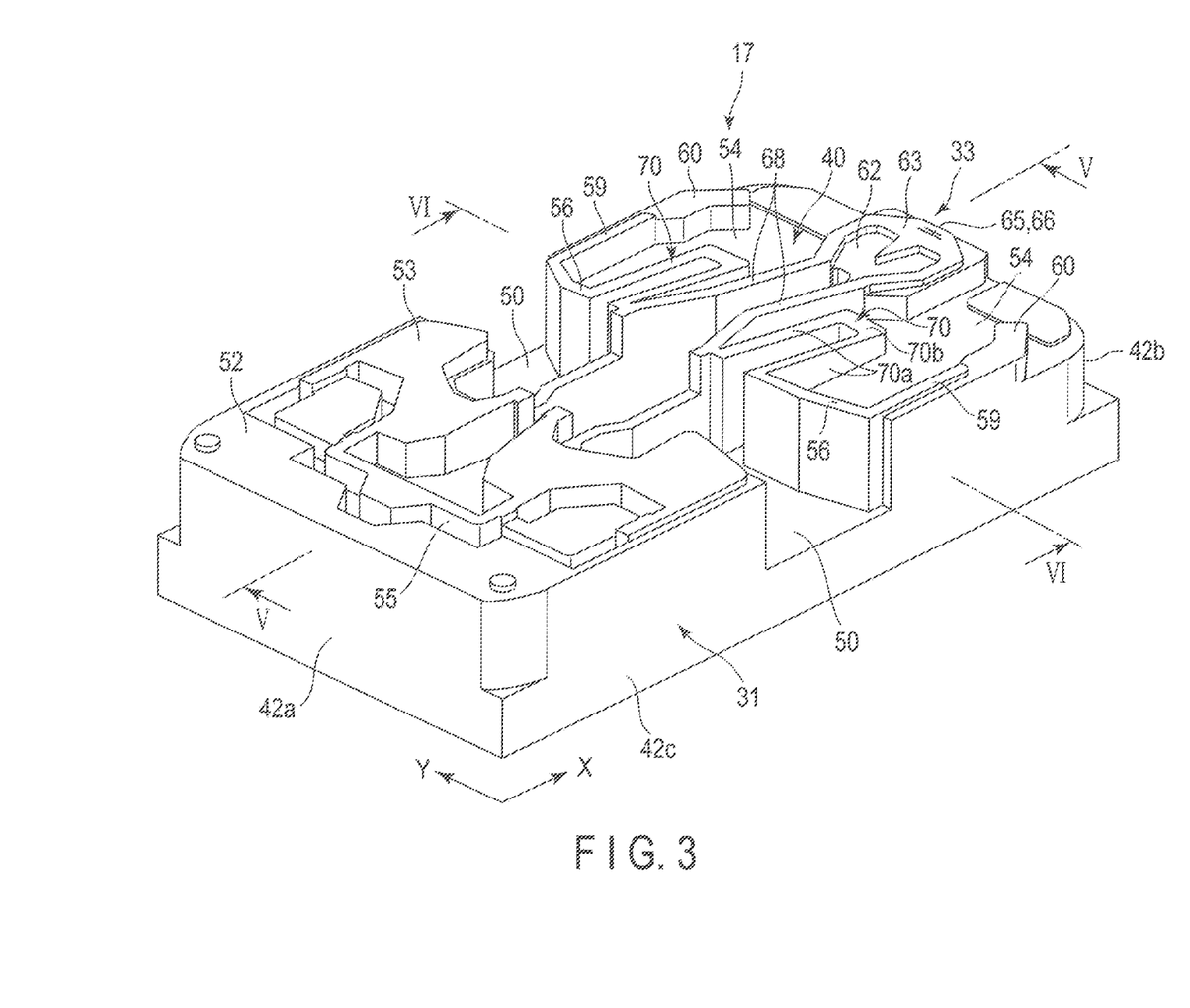
FIG. 3 is a perspective view of the magnetic head in an air bearing surface (ABS) side.

Now, the structure of the magnetic head 17 will be explained. FIG. 3 is a perspective view showing the magnetic head in the ABS side, and FIG. 4 is a plan view showing the magnetic head in the ABS side.

Figure 4:
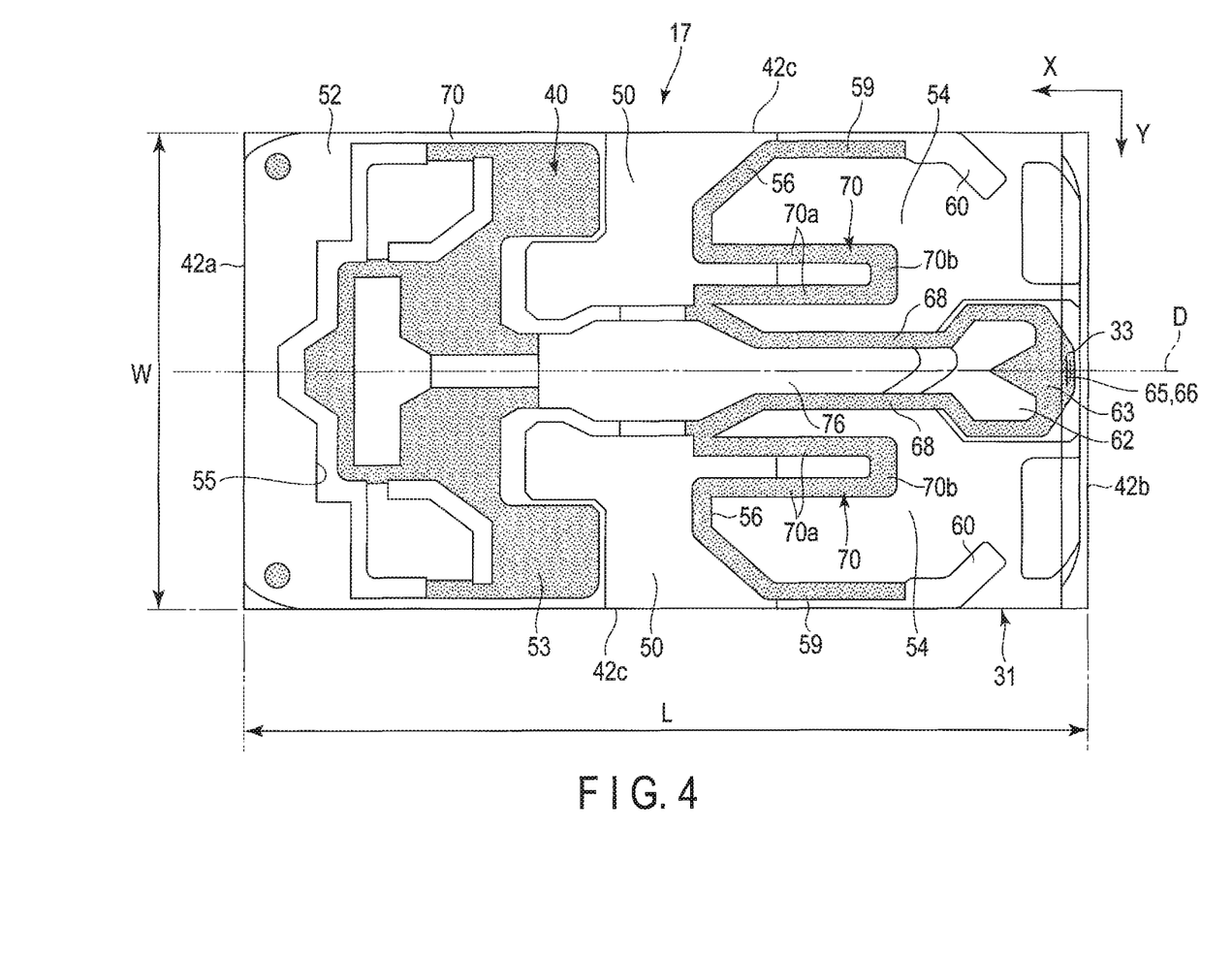
FIG. 4 is a plan view showing the magnetic head on the ABS side.

As shown in FIGS. 3 and 4, the slider 31 of the magnetic head 17 includes the rectangular air bearing surface (disk facing surface) (ABS) opposed to the surface of the magnetic disk 16, an inflow-side end surface (leading-side end surface) 42a extending to be orthogonal to the ABS 40, an outflow-side end surface (trailing-side end surface) 42b extending to be orthogonal to the ABS 40, and a pair of side surfaces (side portions) 42c extending between the inflow-side end surface 42a and the outflow-side end surface 42b to be orthogonal to the ABS 40. The slider 31 includes a rear surface positioned to be opposite to the ABS 40, and the rear surface is to be fixed to the gimbal portion of the flexure 41.

A longitudinal direction of the ABS 40 is defined as a first direction X, and a width direction perpendicular to the first direction X is defined as a second direction Y. A center axis line D of the magnetic head 17 extends in the first direction X passing through the center of the magnetic head 17. In this embodiment, the slider 31 has a length L1 in the first direction X of 1.25 mm or less, for example, 1.235 mm, a width W1 in the second direction Y of 1.0 mm or less, for example 0.7 mm, and a thickness T1 of 0.15 to 0.3 mm, and is configured as a so-called Pemto-slider.

Figure 5:
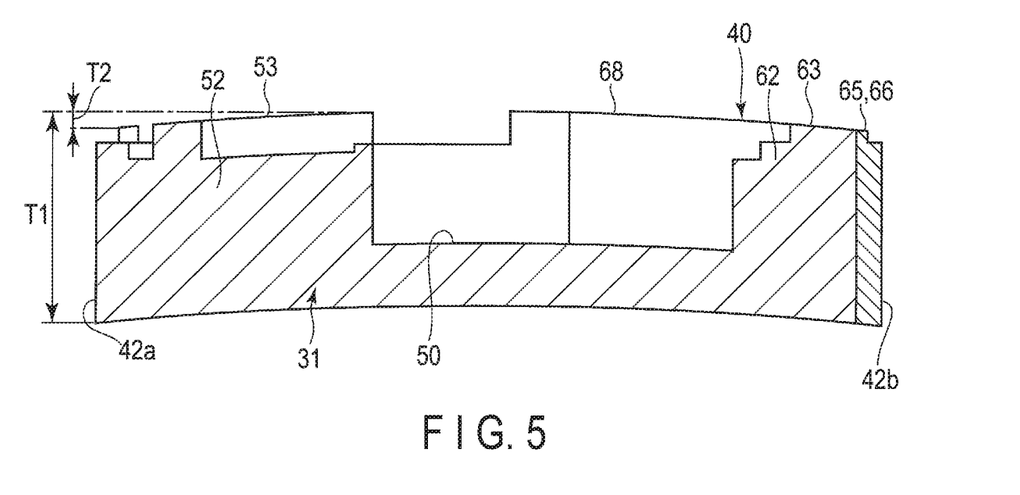
FIG. 5 is a cross-sectional view of the magnetic head, taken along line V-V of FIG. 3.
Figure 6:
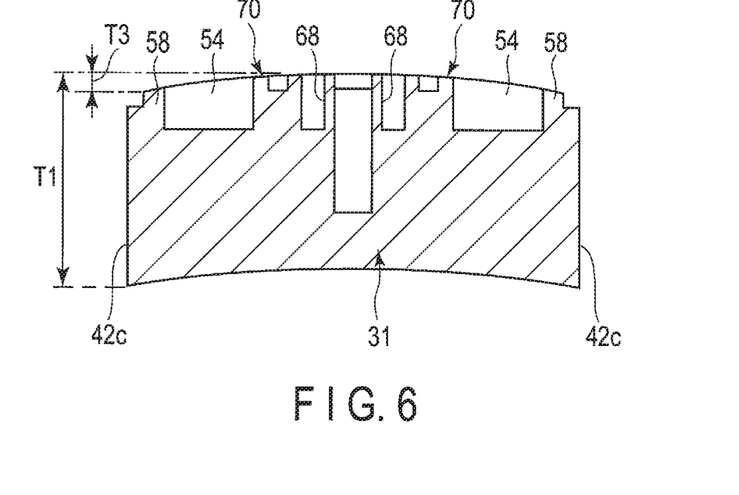
FIG. 6 is a cross-sectional view of the magnetic head, taken along line VI-VI of FIG. 3.

FIG. 5 is a longitudinal sectional view of the slider, taken along line V-V of FIG. 3, and FIG. 6 is a cross-sectional view of the slider, taken along line VI-VI of FIG. 3. As shown, the upper surface of the slider 31 is curved in an arc to be convexed in the first direction X and forms a crown. The ABS 40 is curved in an arc to be convexed in the second direction Y and forms a camber. A height T2 of the center part of the clown is, for example, approximately 15 nm. A height T3 of the center part of the camber is, for example, approximately 0.01 nm.

As shown in FIGS. 3 to 5, a stripe-shaped deep groove 50 is formed in the near-center part of the ABS 40 in the first direction X. The deep groove 50 extends along the entirety of the slider 31 in the second direction Y and opens in the both side surfaces 42c of the slider 31. If the thickness T1 of the slider 31 is, for example, 0.16 mm, the depth of the deep groove 50 is 1 to 5 μm, for example, 3 μm. With the deep groove 50, a negative pressure can be produced in the leading side of the deep groove 50 at any yaw angle realized by the HDD.

A substantially rectangular leading step 52 is A substantially rectangular leading step 52 is formed on the leading-side end portion of the ABS 40. The leading step 52 protrudes from the bottom surface of the deep groove 50 and is positioned on an inflow side of the deep groove 50 with respect to the air flow B.

In order to maintain a pitch angle of the magnetic head 17, a leading pad (inflow-side pressure generating surface) 53 supporting the slider 31 by an air film protrudes from the leading step 52. The leading pad 53 is formed in a letter M with a plurality of openings toward the inflow-side. The upper surface of the leading pad 53 forms the uppermost surface of the slider 31 and is a part of the ABS 40. A leading groove 55 is formed in a position slightly shifted from the inflow-end of the leading step 52 toward the outflow-side.

As shown in FIGS. 3 to 5, the slider 31 includes a trailing step 62 formed at an outflow-side end portion of the ABS 40 in the direction of the air flow B. The trailing step 62 protrudes from the bottom surface of the negative pressure cavity 54, and is formed such that a protruding height thereof is the same as that of the leading step 52. The trailing step 62 is positioned at the substantially center in the second direction Y of the ABS 40. A trailing pad (outflow-side pressure generating surface) 63 for supporting the slider 31 by an air film protrudes from an upper surface of the trailing step 62.

The trailing pad 63 is provided on the trailing step 62 and spaced with a gap from the outflow-side end surface of the trailing step 62, here, from the outflow-side end surface 42b of the slider 31. The trailing pad 63 is formed substantially at the same height as the leading pad 53, intermediate cross rail 56, and side rail 59, and forms the uppermost surface of the slider 31 as a part of the ABS 40.

The head element 33 of the magnetic head 17 includes a recording element 65 and a reading element 66 for recording/reading information to/from the magnetic disk 16. The recording element 65 and the reading element 66 are embedded in a downstream-side end portion of the slider 31 in the direction of the air flow B, here, in the trailing step 62. Tip end portions of the recording element 65 and the reading element 66 are exposed to the ABS 40 at the position of the trailing pad 63.

As shown in FIGS. 3 to 6, a negative pressure cavity 54 including a concave part is formed from the approximate center part of the ABS 40 over the trailing-side end surface 42b. The negative pressure cavity 54 is positioned in the outflow end side of the deep groove 50 and around the trailing step 62, and is opened toward the trailing-side end surface 42b. The negative pressure cavity 54 is formed to be shallower than the deep groove 50, that is, formed in a position higher than the bottom surface of the deep groove 50. The negative pressure cavity 54 has a depth of 500 to 1500 nm, for example, 1000 nm. With the negative pressure cavity 54, a negative pressure can be produced at any yaw angle formed in the HDD.

In the ABS 40, a rib-shaped intermediate cross rail 56, pair of center rail (center pad) 68, and pair of side rail 59 are formed to surround the negative pressure cavity 54.

The intermediate cross rail 56 is positioned between the deep groove 50 and the negative pressure cavity 54 and extends between the side edges of the ABS 40 in the second direction Y. The intermediate cross rail 56 protrudes from a bottom surface of the negative pressure cavity 54 and is positioned on the inflow-side of the negative pressure cavity 54 with respect to the air flow B.

The pair of side rails 59 are formed along each side edge of the ABS 40, and extend in the outflow end side of the ABS 40 from the intermediate cross rail 56. The side rails 59 protrude from the bottom surface of the negative pressure cavity 54.

A pair of skirts 60 are formed along each side edge (side surface 42*c*) and each extend to the proximity of the outflow side end surface 42*b* of the ABS 40 from the side rail 59 in the first direction X. Each skirt 60 protrudes from the bottom surface of the negative pressure cavity 54 and is formed to be lowered as compared to the side rail 59.

The intermediate cross rail 56, side rails 59, and skirts 60 are, as a whole, formed substantially as a letter U the upper flow side of which is closed and opening toward the lower flow side. The intermediate cross rail 56, side rails 59, and skirts 60 define the negative pressure cavity 54.

The pair of center rails 68 extend from the intermediate cross rail 56 to the trailing step 62 in the first direction X. The center rails 68 are positioned in the both sides of the center axis line D of the slider 31 and are opposed to each other with a gap therebetween in the second direction Y. The height of the center rail 68 from the bottom surface of the negative pressure cavity 54 is the same height as the intermediate cross rail 56 and the trailing pad 63. A guide groove 76 is formed between the center rails 68 to introduce air current to the trailing step 62 and the trailing pad 63. The guide groove 76 is formed along the center axis line D, passes the deep groove 50, and further extends to the leading step 52.

A pair of intermediate pads 70 are disposed in an area between the deep groove 50 and the trailing step 62, and furthermore, in an area between the center rail 68 and the side rail 59. That is, the intermediate pads 70 are disposed in both sides of the center rail 68. Each intermediate pad 70 substantially forms a letter U extending from the intermediate cross rail 56 to the trailing end side. Specifically, the intermediate pad 70 includes a first ribs 70*a* each extending from the intermediate cross rail 56 to the trailing end side of the slider 31 in the first direction X, and a second rib 70*b* extending in the second direction Y and connected to the extending ends of the first ribs 70*a*. The first ribs 70*a* are arranged parallel to each other with a gap therebetween in the second direction Y. The second rib 70*b* has a width which is greater than that of the first rib 70*a*. An internal space defined by the first ribs 70*a* and the second rib 70*b* opens to the leading side of the slider 31, that is, in the deep groove 50. The intermediate pad 70 has a height from the bottom surface of the negative pressure cavity 54 which is the same as the height of the middle cross rail 56 and the trailing pad 63.

Figure 7:
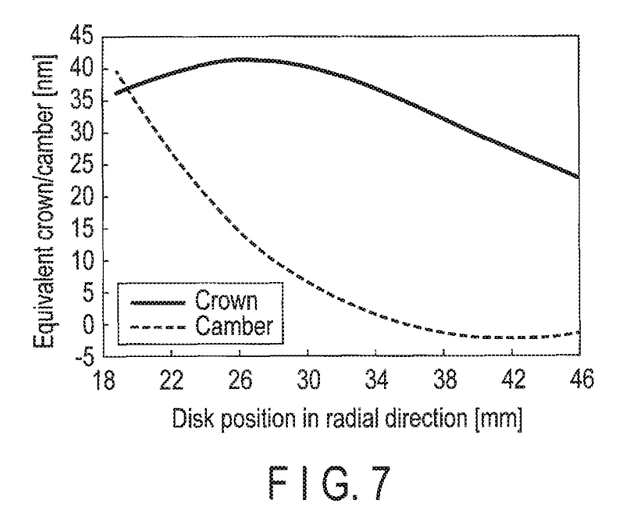
FIG. 7 is a view showing an equivalent crown/camber change in a radial direction position of the magnetic disk.
Figure 8A:
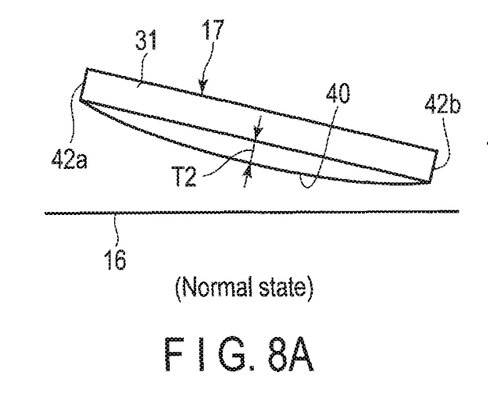
FIG. 8A is a schematic view of a hovering position of the magnetic head in a normal state.
Figure 8B:
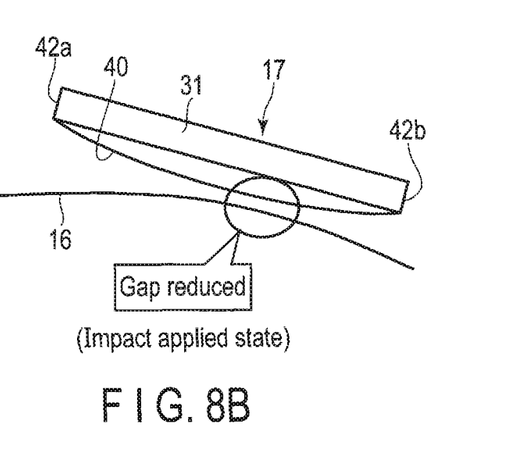
FIG. 8B is a schematic view of a hovering position of the magnetic head in a disk-deformed state.

FIG. 7 shows an equivalent crown/camber change in accordance with a change of the magnetic disk (position in the radial direction). As shown, the equivalent crown/camber increases in the inner peripheral side of the magnetic disk. Thus, if a deformation occurs in the magnetic disk, a flying position of the slider is greatly affected in the inner periphery region of the magnetic disk, and thus, the slider may possibly contact the magnetic disk. As shown in FIG. 8A, in general, the flying position of the magnetic head is inclined such that the trailing end 42*b* side of the slider 31 becomes closer to the magnetic disk and the leading end 42*a* side thereof is further apart from the magnetic disk 16. Furthermore, the crown is formed on the ABS 40 of the slider 31. Thus, as shown in FIG. 8B, if the magnetic disk 16 is deformed as a convex with respect to the magnetic head 17 caused by an external impact or the like, the equivalent crown is added to the deformation of the magnetic disk, and thus, the area between the center part of the slider 31 and the trailing pad, that is, in this example, the proximity of the center rail 68 of the slider 31 becomes closest to the magnetic disk surface. That is, the proximity of the center rail flies the least.

In contrast, as described above, in the magnetic head 17 of the present embodiment, the intermediate pads 70 are provided on the both sides of the center rail 68 as the second pressure generators. Thus, if a gap between the surface of the magnetic disk 16 and an area including the center rail 68 and the intermediate pads 70 is narrowed by deformation of the magnetic disk 16, the intermediate pads 70 produce a positive pressure, and the gap can be maintained. That is, the intermediate pads 70 produce a positive pressure to suppress a contact of the magnetic head 17 and the surface of the magnetic disk. Note that the intermediate pads 70 are disposed in the center part of the slider 31 in the width direction and an influence to the flying state of the slider 31 can be minimized.

Figure 9:
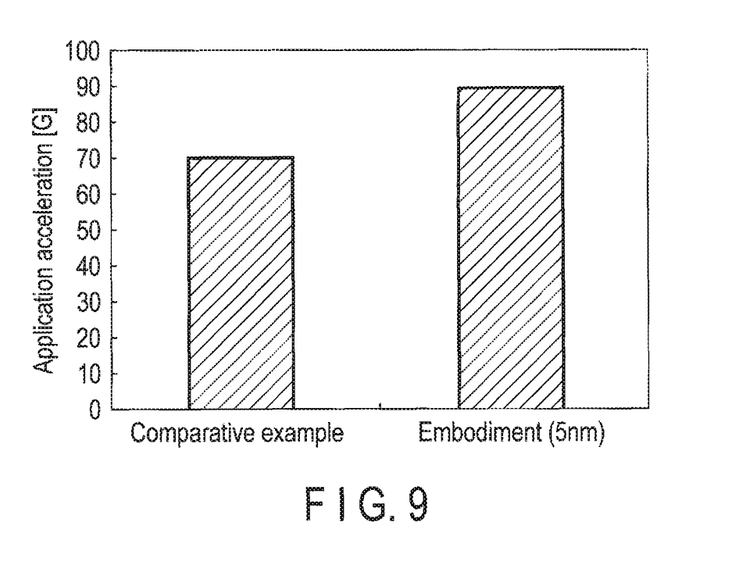
FIG. 9 is a view showing a comparison of impact resistance between the magnetic head of the first embodiment and a magnetic head of a comparative example (in which a sub pressure generator is not disposed).

FIG. 9 shows a comparison of impact resistance between the magnetic head of the present embodiment and a magnetic head (which does not include an intermediate pad) of a comparative example. As shown, the magnetic head of the comparative example contacts a magnetic disk when an external impact is applied thereto at an application acceleration of 70 G while the magnetic head of the present embodiment contacts the magnetic disk first at an application acceleration of approximately 90 G. The magnetic head of the present embodiment has an approximately 28% higher impact resistance as compared to the comparative example.

As can be understood from the above, in the present embodiment, a magnetic head which less contacts a recording medium to increase the reliability and a magnetic disk device including the magnetic head can be achieved.

Now, a magnetic head of another embodiment will be explained. Note that, in the following embodiment, elements corresponding to those of the first embodiment will be referred to by the same reference numbers and the detailed description thereof may be omitted or simplified while differences from the first embodiment will be mainly described.

Second Embodiment

Figure 10:
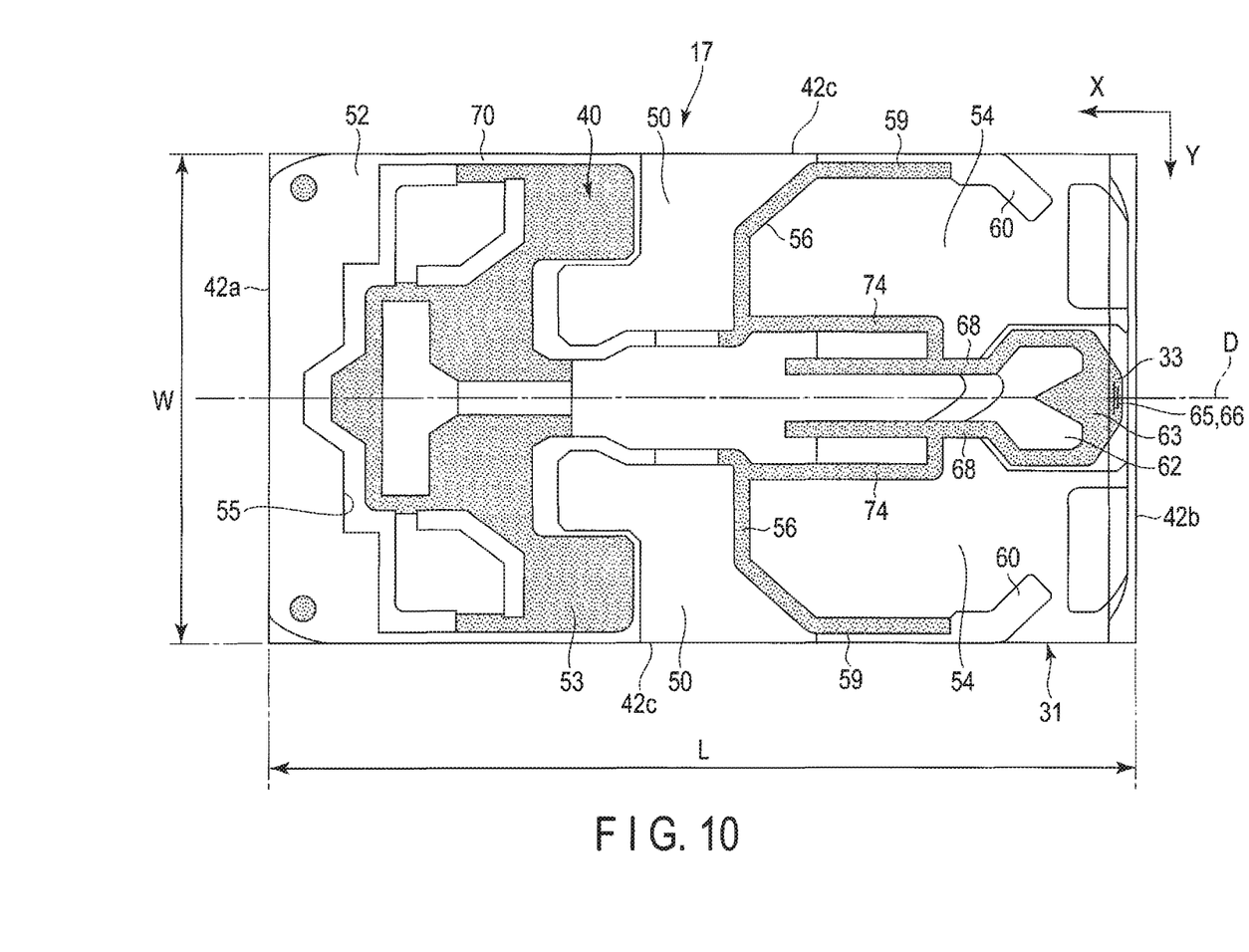
FIG. 10 is a plan view of a magnetic head of a second embodiment in an ABS side.

FIG. 10 is a schematic view of a magnetic head according to a second embodiment in an ABS side. As shown, in the second embodiment, a leading side end of a pair of center rails 68 is not connected to the intermediate cross rail 56 but is apart from the intermediate cross rail 56. A pair of intermediate pads 74 as second pressure generators each extend from the center rail 68 in the second direction Y, and bend to the leading side to extend in the first direction X to be connected to the intermediate cross rail 56. The pair of intermediate pads 74 are formed to have a height from the bottom surface of the negative pressure cavity 54 which is the same as the height of the intermediate cross rail 56 and the trailing pad 63. A space between the intermediate pad 74 and the center rail 68 opens to the leading side of the slider 31, in this example, to the deep groove 50.

The intermediate pads 74 structured as above has the same function and advantages as those of the intermediate pads 70 in the first embodiment. Thus, in the second embodiment, a magnetic head which less contacts a recording medium to increase the reliability and a magnetic disk device including the magnetic head can be achieved.

Third Embodiment

Figure 11:
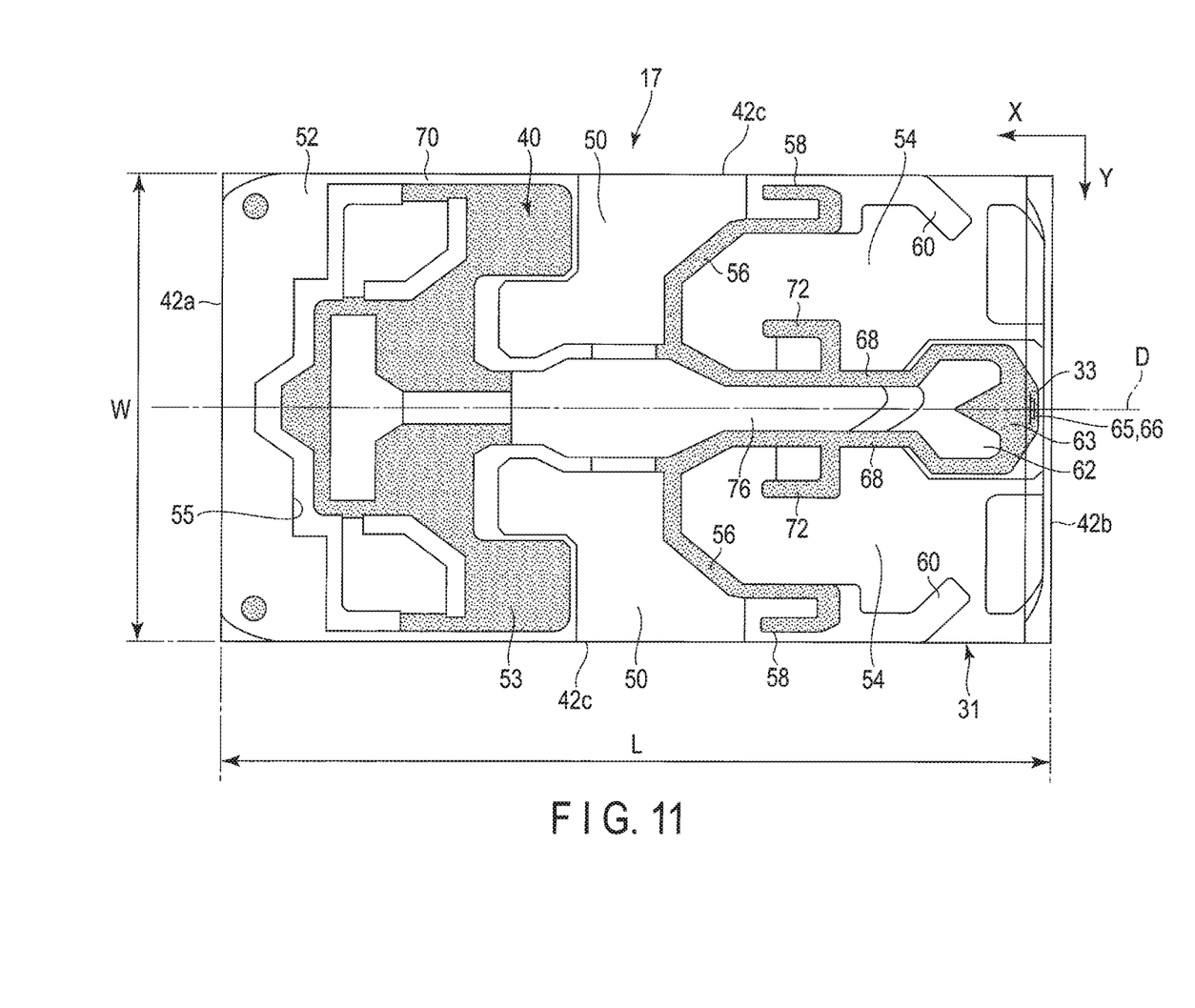
FIG. 11 is a plan view of a magnetic head of a third embodiment in an ABS side.

FIG. 11 is a plan view of a magnetic head according to a third embodiment in an ABS side.

As shown, in the third embodiment, a pair of intermediate pads 72 as second pressure generators each extend from the center part of the center rail 68 in the second direction Y, and bend in the leading side to extend in the first direction X as substantially a hook. The intermediate pads 74 are formed to have a height from the bottom surface of the negative pressure cavity 54 which is the same as the height of the intermediate cross rail 56 and the trailing pad 63. A space between the intermediate pad 74 and the center rail 68 opens to the leading side of the slider 31, in this example, to the negative pressure cavity 54.

In the present embodiment, the slider 31 comprises a pair of side pads 58. The side pads 58 are formed along each side edge of the ABS 40, extend from the intermediate cross rail 56 to the outflow end side of the ABS 40, bend in the side edge side, further bend in the leading side, and extend in the leading side along the side edge. The side pads 58 protrude from the bottom surface of the negative pressure cavity 54. The height of the side pads 58 is the same as the height of the intermediate cross rail 56 and the trailing pad 63.

The intermediate pads 72 structured as above has the same function and advantages as those of the intermediate pads 70 in the first embodiment. Thus, in the third embodiment, a magnetic head which less contacts a recording medium to increase the reliability and a magnetic disk device including the magnetic head can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the slider of the magnetic head is not limited to a Pemto slider, and it may be a pico-slider, femto-slider, or greater-size slider. The shape, size, and the like of the trailing step, trailing pad, and other parts in the slider may be changed arbitrarily. In the disk drive, the magnetic disk is not limited to a 3.5 inch type. The number of magnetic disks is not limited to two, and it may be one or three or more, and the number of the magnetic heads may be increased or decreased to conform to the number of the magnetic disks.

What is claimed is:

1. A magnetic head comprising:
a slider comprising an air bearing surface with a pair of side edges, a pair of side surfaces along the pair of side edges of the air bearing surface, a leading side end surface, and a trailing side end surface; and
a head element in the slider, configured to process data, wherein
the slider comprises a leading step at a leading side end of the air bearing surface, a trailing step at a trailing side end of the air bearing surface and including the head element, a deep groove formed between the leading step and the trailing step and opening to the air bearing surface and the pair of side surfaces, a center rail extending from a center portion of the air bearing surface to the trailing step, and a pair of pressure generators disposed between the center rail and each side edge, and
each of the pressure generators comprises an intermediate pad extending from the center rail to the side edge side and bending toward the reading end side of the slider.

2. The magnetic head of claim 1, wherein a space defined between the intermediate pad and the center rail opens to the leading side of the slider.

3. A magnetic disk device comprising:
a rotatable disk-shaped recording medium; and
the magnetic head of claim 1 configured to process data with respect to the recording medium.

4. The magnetic disk device of claim 3, wherein a space defined by the intermediate pad and the center rail opens to the leading side of the slider.

5. A magnetic head comprising:
a slider comprising an air bearing surface with a pair of side edges, a pair of side surfaces along the pair of side edges of the air bearing surface, a leading side end surface, and a trailing side end surface; and
a head element in the slider, configured to process data, wherein
the slider comprises a leading step at a leading side end of the air bearing surface, a trailing step at a trailing side end of the air bearing surface and including the head element, a deep groove formed between the leading step and the trailing step and opening to the air bearing surface and the pair of side surfaces, a center rail extending from a center portion of the air bearing surface to the trailing step, an intermediate cross rail extending along the deep groove between the pair of side edges, and a pair of pressure generators disposed between the center rail and each side edge, and
each of the pressure generators comprises an intermediate pad extending from the middle cross rail to the trailing end side of the slider along the center rail.

6. The magnetic head of claim 5, wherein the intermediate pad includes a pair of first ribs each extending from the intermediate cross rail to the trailing end side of the slider and a second rib connected to the extending ends of the first ribs, and an inner space defined by the first and second ribs opens to the leading side of the slider.

7. A magnetic disk device comprising:
a rotatable disk-shaped recording medium; and
the magnetic head of claim 5 configured to process data with respect to the recording medium.

8. The magnetic disk device of claim 7, wherein the intermediate pad comprises a pair of first ribs each extending from the intermediate cross rail to the trailing end side of the slider and a second rib connected to the extending ends of the first ribs, and an inner space defined by the first and second ribs opens to the leading side of the slider.

* * * * *